United States Patent [19]

Asada

[11] Patent Number: 4,585,428
[45] Date of Patent: Apr. 29, 1986

[54] DAMPER DISC

[75] Inventor: Masaaki Asada, Ibaraki, Japan

[73] Assignee: Kabushiki Kaisha Daikin Seisakusho, Osaka, Japan

[21] Appl. No.: 618,547

[22] Filed: Jun. 8, 1984

[30] Foreign Application Priority Data

Jun. 9, 1983 [JP] Japan .................. 58-88925[U]

[51] Int. Cl.$^4$ .............................................. F16D 3/14
[52] U.S. Cl. ................................... 464/68; 192/106.2
[58] Field of Search .................... 192/106.1, 106.2; 464/62, 63, 66, 68

[56] References Cited

U.S. PATENT DOCUMENTS

| 4,354,586 | 10/1982 | Stanley | 192/106.2 |
| 4,406,357 | 9/1983 | Nagano et al. | 192/106.2 |
| 4,453,838 | 6/1984 | Loizeau | 192/106.2 X |

FOREIGN PATENT DOCUMENTS

| 2325711 | 12/1973 | Fed. Rep. of Germany | 192/106.2 |
| 2225650 | 4/1974 | France | 192/106.2 |
| 131834 | 10/1981 | Japan | 192/106.1 |
| 2093564 | 9/1982 | United Kingdom | 464/68 |

Primary Examiner—John M. Jillions
Assistant Examiner—Daniel P. Stodola
Attorney, Agent, or Firm—Burns, Doane, Swecker & Mathis

[57] ABSTRACT

A damper disc comprises a hub to be connected to a shaft and having a radial flange; a pair of side plates disposed at both sides of the hub flange; sub-plates disposed relatively rotatably between the hub flange and the side plates; torsion springs circumferentially connecting the flange and the side plates; a first friction mechanism disposed between the hub and the sub-plates; and a second friction mechanism disposed between the side plates and the sub-plates. Said first friction mechanism includes a cylindrical bushing fitted into the sub-plate and a cone spring. The bushing is provided at an end with a radial flange which is pressed to the hub flange by the cone spring disposed between the sub-plate and the bushing flange. The sub-plate and the bushing are prevented from relative rotation.

9 Claims, 9 Drawing Figures

DAMPER DISC

BACKGROUND AND SUMMARY OF THE INVENTION

The present invention relates to a damper disc suitable for a clutch disc of an automobile or the like.

The clutch disc for the automobile has been improved to prevent noises in driving mechanisms such as a transmission, a differential mechanism and others. Some of the improved clutches have such characteristics that a rate of increasing of a torque increases in stages in accordance with an increasement of a torsion angle, and that hysteresis torque changes dependently on the stages. One of the improvements, which is disclosed in the Japanese Patent Application No. 56-20510 (U.S. patent application Ser. No. 347,157), will be detailed hereinafter with reference to FIG. 1. In FIG. 1, a flange of a splinable hub 1 is divided into a radially inner flange 2 and an outer flange 3. A pair of subplates 4 are fixed to both side surfaces of the flange 3. A torsion spring 5 is disposed between the inner flange 2 and the sub-plates 4. Two kinds of springs 8 (only one is shown) are disposed between the outer flange 3 and a pair of side plates 6 and 7, so that the disc has damping characteristics of three stages. A wave spring 9 functioning as a first friction means is disposed between the flange 2 and each sub-plate 4. Friction washers 10 functioning as second and third friction means are disposed between the sub-plates 4 and the side plates 6 and 7. These friction means cause first, second and third hysteresis torques.

However, in the above clutch disc, since undulations of the wave springs 9 partially contact the flange 2 and the sub-plates 4, long use may cause seizure or the like, and thus, the frictional characteristics may change. Further, the load-compression characteristic of each wave spring 9 is substantially linear as shown in FIG. 2. This causes the following disadvantage. Namely, if a distance between the flange 2 and each sub-plate 4 has an error of $\Delta l$ with respect to an intended value of l, a compressed length of each spring 9 also has an error of $\Delta l$ with respect to an intended value. This causes a large error of $\Delta P$ with respect to an intended compression load. Therefore, the wave springs 9 can not produce a constant hysteresis torque, which may increase noise in a driving mechanism during an idling, a constant running at a high speed and others.

Accordingly, it is an object of the invention to provide an improved disc having a stable first hysteresis torque to reduce the noise in the driving mechanism.

According to the invention, a bushing is disposed between an inner periphery of a sub-plate and an outer periphery of a hub. The bush is provided with an annular flange contacting with a hub flange of the hub. A cone spring is disposed between the radially inner portion of the sub-plate and said flange of bushing. The sub-plate, the cone spring and the bushing are prevented from relative rotation by a stopper means. A friction member is disposed between a radially inner portion of other sub-plate and the flange of the hub.

Other and further objects, features and advanges of the invention will appear more fully from the following description of the preferred embodiments of the invention.

DETAILED DESCRIPTION OF THE PREFERRED EMBODIMENTS

Figure 1:
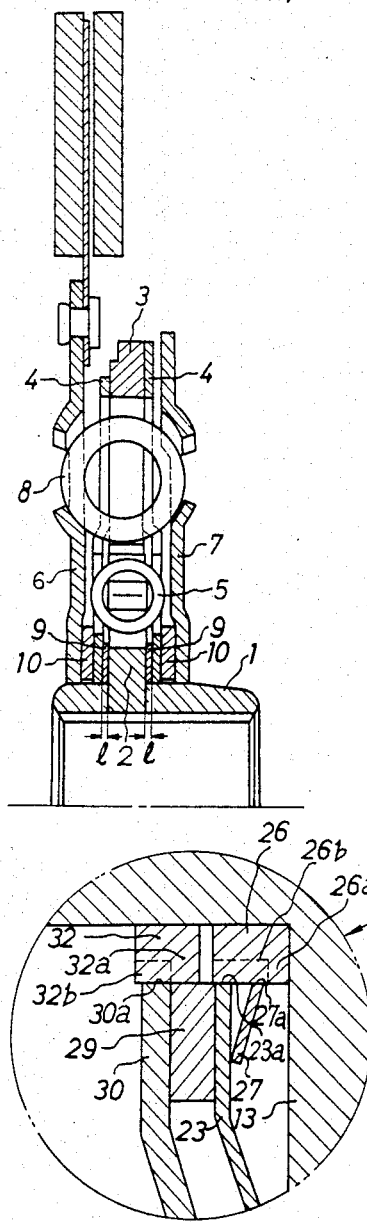
FIG. 1 is a sectional partial view of a conventional disc.
Figure 3:
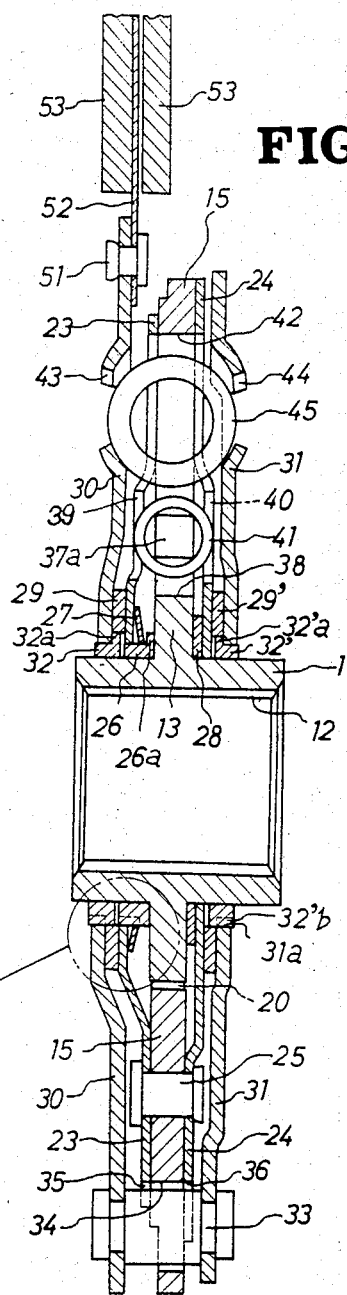
FIG. 3 is a sectional partial view of a clutch disc of an embodiment of the invention.
Figure 2:
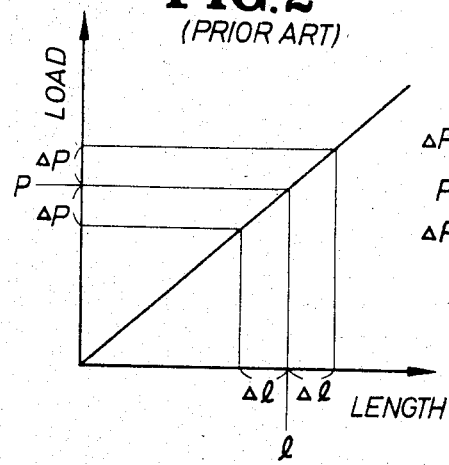
FIG. 2 is a graph showing a load-compression characteristic of a wave spring.

Referring to FIG. 3, a spline hub 11 is provided at the inner periphery with spline teeth 12 to be splined to an input shaft of a transmission (not shown). An inner flange 13 is integrally formed around the spline hub 11 and is provided with some, e.g., three, outer teeth 14. A substantially annular outer flange 15 is disposed around the inner flange 13.

Figure 4:
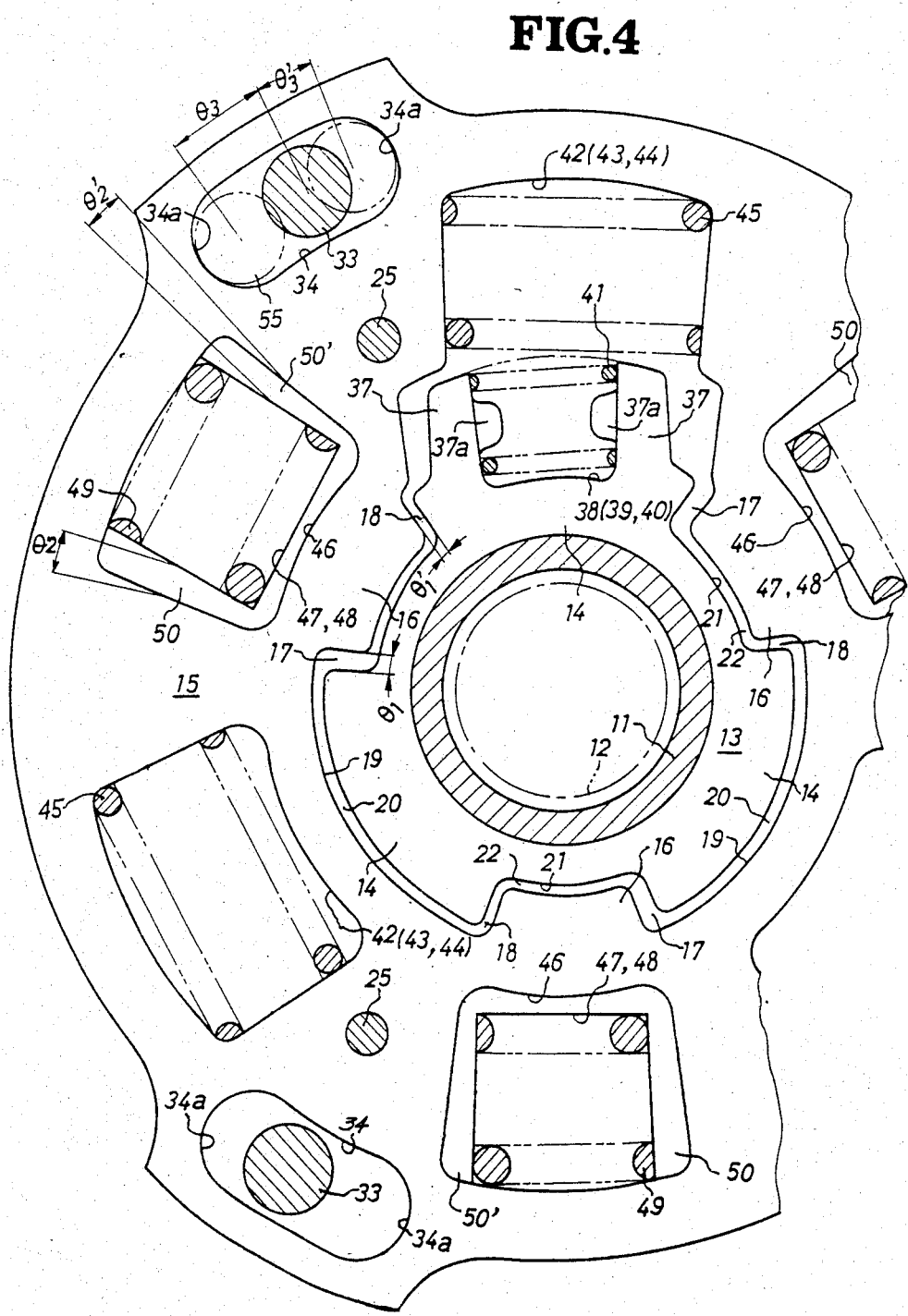
FIG. 4 is a plane view of a disc of FIG. 3 with certain parts cut-away.

The flange 15 has inner teeth 16 respectively meshable with the outer teeth 14. As shown in FIG. 4, circumferential spaces 17 and 18 are formed between the teeth 14 and 16. Radial spaces 20 are formed between the outer teeth 14 and outer flange 15. Radial spaces 21 are formed between the inner flange 13 and the inner teeth 16. Referring to FIG. 3, a pair of annular sub-plates 23 and 24 are fixed by rivets 25 to both surfaces of the flange 15. The sub-plates 23 and 24 are rotatably fitted, as detailed later, around the hub 11 to support the flange 15 with keeping the spaces 20 and 22.

Figure 7:
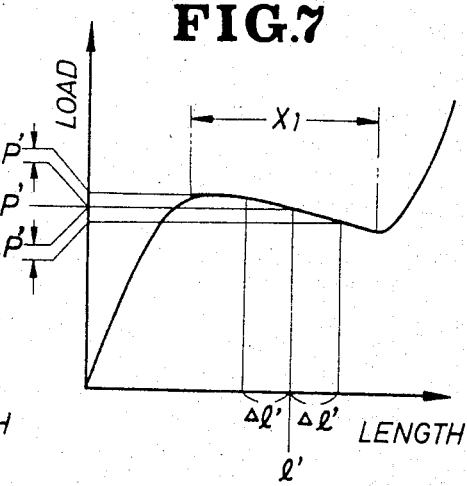
FIG. 7 is a graph showing a load—compression characteristic of a cone spring.

A bushing 26 is disposed between the sub-plate 23 and the hub 11. The bush is made of synthetic resin or metal having a small coefficient of friction. The bush 26 is provided at an end with an integral radial flange 26a. A cone spring 27 (Belleville spring) is disposed between the radially inner portion of the sub-plate 23 and the flange 26a to press the flange 26a against the inner flange 13. The spring 27 has a load-compression characteristic shown in FIG. 7.

Figure 5:
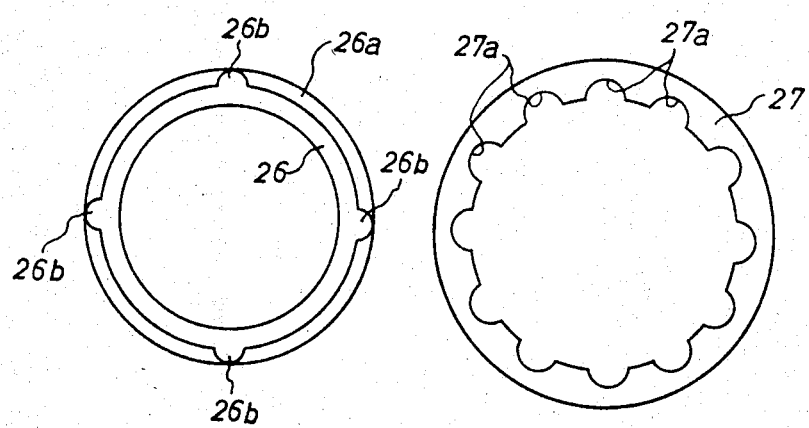
FIG. 5 is a front view of a bushing and a cone spring.

The sub-plate 23, the cone spring 27 and the bushing 26 are prevented from relative rotation by a way described hereinafter. As shown in an enlarged portion of FIG. 3, the bush 26 is provided at the outer periphery with a plurality of (e.g., four) integral ribs 26b, which extend from the flange 26a to the other end of the bushing 26. The ribs 26b are also illustrated in FIG. 5. The cone spring 27 (FIG. 5) and the sub-plates 23 are respectively provided at the inner peripheries with a plurality of (e.g., twelve) recesses 27a and 23a. Four of the recesses 23a and four of the recesses 27a engage with the ribs 26b. A friction washer 28 (friction member) is disposed between the sub-plate 24 and the inner flange 13.

A pair of side plates 30 and 31 which are a clutch plate and a retaining plate respectively are disposed at axially outer sides of the sub-plates 23 and 24. A friction washer 29 is disposed between the sub-plate 23 and the side plate 30. A friction washer 29' is disposed between the sub-plate 24 and the side plates 31. Both plate 30 and 31 are rotatably fitted onto the hub 11 through bushings 32 and 32'. The bushings 32 and 32' have, as similarly as the bushing 26, radial flanges 32a and 32'a as well as outer ribs 32b and 32'b, respectively. The flanges 32a and 32'a contact the inside surfaces of the side plates 30 and 31, respectively. The ribs 32b and 32'b engage recesses 30a and 31a formed at the inner peripheries of the side plate 30 and 31, respectively. The radially outer portions of the side plates 30 and 31 are rigidly connected together by stop pins 33, which extend through openings 34 in the flange 15 and recesses 35 and 36 in the sub-plates 23 and 24. Circumferential spaces are formed between edges 34a (FIG. 4) of the openings 34 and the stop pins 33.

As shown in FIG. 4, one of the outer teeth 14 is provided with a pair of integral projections 37, between which an opening 38 is formed. Both sub-plates 23 and 24 (FIG. 3) are provided with openings 39 and 40 which are axially registered with and have the same length as the opening 37. A thin first torsion spring 41 is engaged in the opening 41. The projections 37 are provided with protrusions 37a which enter into the ends of the spring 41 for preventing it from disengagement.

The flange 15 is provided with circumferentially spaced, e.g., three, openings 42. The sub-plates 23 and 24 have openings registering with the openings 42. The side plates 30 and 31 are provided with openings 43 and 44 axially registering with the openings 42. Thick second torsion springs 45 are engaged in the openings 42, 43 and 44.

The flange 15 and the sub-plate 23 and 24 are provided with circumferentially spaced, e.g., three, openings 46. The side plates 30 and 31 are provided with openings 47 and 48 which are aligned axially to and are circumferentially longer than the openings 46. Further thick third torsion springs 49 are disposed in the openings 46, 47 and 48. In an illustrated neutral position, the springs 49 engage with the edges of the openings 48 and 49, and are apart from the edges of the openings 46 with circumferential spaces 50 and 50' therebetween.

As shown in FIG. 3, a plurality of cushioning plates 52 (only one is shown) are fixed by rivets 51 to the radially outer portion of the side plate 30. A pair of annular friction facings 53 are fixed to both surfaces of the plates 52. The facings 53 are disposed between a flywheel of an engine and a pressure plate (both of them are not shown).

An operation is as follows. In an engaged condition of the clutch, the facings 53 are pinched by the pressure plate and the flywheel, so that the torque of the engine is transmitted from the flywheel through the facings 53 and the cushioning plates 52 to the side plates 30 and 31. The torque is then transmitted from the side plates 30 and 31 mainly through the springs 41, 45 and 49 and the hub 11 to the input shaft of the transmission. And, thus, the disc rotates counterclockwise (direction shown by an arrow A). In positive and negative accelerations, the torque changes, so that the flange 15 rotates relatively to the flange 13 and the side plates 30 and 31 rotate relatively to the flange 15, as detailed hereinafter.

When the torque increases from zero (FIG. 6), the spring 41 is compressed, and the side plates 30, 31, the sub-plates 23 and 24 and the outer flange 15 rotate relatively to the inner flange 13 in the direction of the arrow A.

When the torsion angle (relative rotation angle) between the flange 13 and the side plates 30 and 31 increases to a value of $\theta 1$, the space 17 decreases to zero and the teeth 16 and 14 contact together, so that both flanges 13 and 15 are rigidly connected thereafter. In this first stage (a section of torsion angles 0 to $\theta 1$), a first hysteresis torque is generated by frictions between the bushing 26 and the hub 11, between the flanges 26a and the inner flange 13 and between the friction washer 28 and the flange 13 or the sub-plate 24. The characteristic in this first stage is shown by a line B1 in FIG. 6.

When the torque increases further, the second torsion springs 45 are compressed, and the side plates 30 and 31 rotate relatively to the flanges 13 and 15 as well as the sub-plates 23 and 24 in the direction A.

When the angle increases to a value of $\theta 1 + \theta 2$, the ends of the torsion springs 49 engage with the edges of the openings 46, and thereafter, both of the springs 45 and 49 are compressed.

When the angle increases to a value of $\theta 1 + \theta 3$, the stop pins 33 contact with the edges 34a of the openings 34, so that all of the members are rigidly connected.

Hysteresis torques H2 and H3 in the second and third stages ($\theta 3$), are generated by frictions between the bushings 32 and 32' and the hub 11 between the friction washer 29 and the side plate 30 or the sub-plate 23, and between the washer 29' and the side plate 31 or the sub-plate 24. The characteristics in the second and third stages are illustrated by lines C1 and D1 in FIG. 6.

Figure 6:
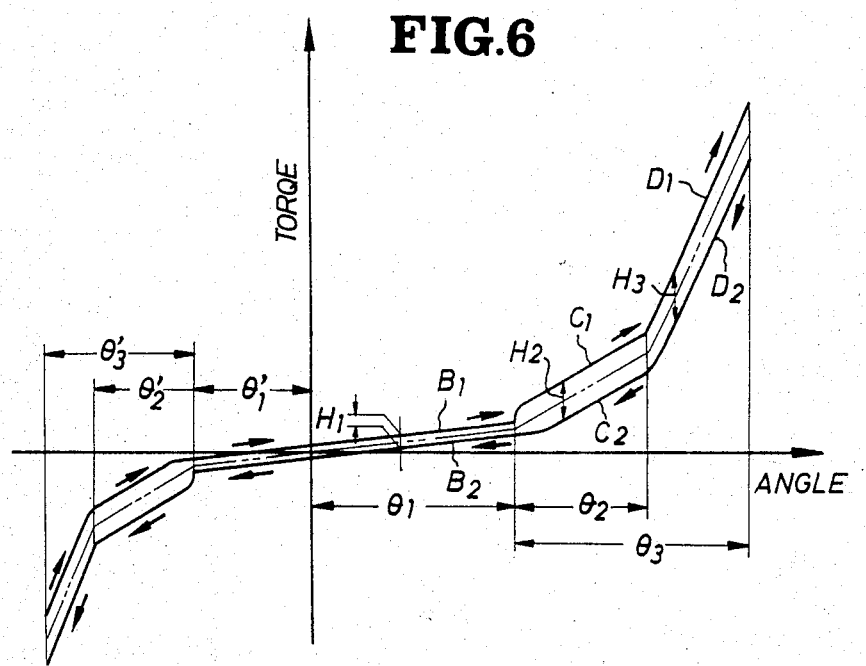
FIG. 6 is a graph showing a torsion angle—torsion torque characteristic.

When the torque decreases, the torsion angle decreases along lines D2—C2—B2 in FIG. 6. In a negative area, the members and the portions operate similarly as and reversely to the above positive operations.

According to the invention, since the bushing 26 engages at its full surface with the flange 11, the seizure is prevented between the bushing 26 and the hub 11. The compression-load characteristic of the cone spring 27 has such a long section X1 shown in FIG. 7 that the load does not change largely with respect to the large change of the compression length, and the intended value of the compression is set at a middle value l' in the section X1. Therefore, if the actual value of the compression deviates by a value $\Delta l'$ from the intended value l', the deviation $\Delta P'$ of the compression load P' can be sufficiently small. Accordingly, the first hysteresis torque H1 (friction torque) can be stable, which sufficiently reduces the noise in the driving mechanism. Further, since the sub-plate 23, the cone spring 27 and the bushing 26 are prevented from the relative rotation, the cone spring 27 does not frictionally slide, so that the spring 27 is surely prevented from wear and deformation.

Figure 8:
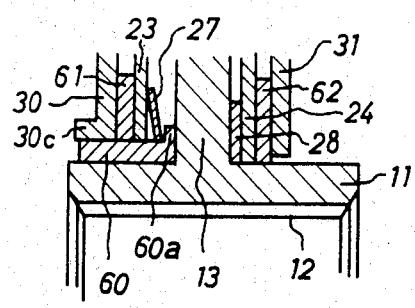
FIG. 8 is a sectional partial view of a disc of another embodiment.
Figure 9:
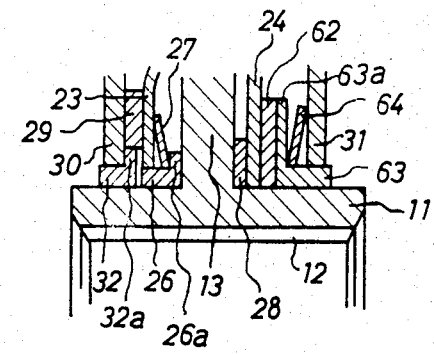
FIG. 9 is a sectional partial view of a disc of still another embodiment.

Modifications of the invention are illustrated in FIGS. 8 and 9. Refrerring to FIG. 8, a long bushing 60 is employed. The bushing is provided with a radial flange 60a which is pressed by a cone spring 27 to an inner flange 13. A sub-plate 23, the cone spring 27 and the bushing 60 are prevented from relative rotation by a similar way as said first embodiment. A side plate 30 is provided at the inner periphery with a cylindrical flange 30c projecting axially outwardly. The flange 30c engages rotatably around the bushing 60. A friction washer 61 is disposed between the side plate 30 and the sub-plate 23. A friction washer 28 is disposed between the flange 13 and a sub-plate 24. A friction washer 62 is disposed between the sub-plate 24 and a side plate 31. A first friction torque is generated by friction between the bush 60 and the hub 11 and between the washer 28 and the flange 13 or sub-plate 24. Second and third hysteresis torques are generated by friction between the bushing 60 and the flange 60a, between the washer 61 and the plate 30 or the sub-plate 23 and between the washer 62 and the sub-plate 24 or the plate 31.

In another embodiment in FIG. 9, a bushing 63 is disposed between a side plate 31 and a hub 11. The bushing 63 is provided at an end with a radial flange 63a which is pressed by a cone spring 64 to a sub-plate 24 through a friction washer 62. The plate 31, the spring 64 and the bushing 63 are prevented from relative rotation.

The present invention may be applied to a clutch disc having a pair of sub-plates and a hub flange which is not divided. The disc of the invention may be used as a damper disc, e.g., for marine boat, in which a side plate is directly fixed to a flywheel of an engine.

Although the invention has been described in its preferred form with a certain degree of particularity, it must be understood that the details of construction may be changed and the combination and arrangement of parts may be varied without departing from the scope of the invention as hereinafter claimed.

What is claimed is:

1. A damper disc comprising
   a hub to be connected to a shaft and having a radial flange divided into an outer flange portion and an inner flange portion, the inner and outer flange portions being drivingly engageable;
   a pair of side plates disposed relatively rotatably adjacent the radial flange;
   torsion spring means circumferentially connecting the outer flange portion and the side plates;
   a sub-plate attached to the outer flange portion, positioned between one of the side plates and the radial flange, and having a plurality of notches;
   a first friction means disposed between the hub and the sub-plate for exerting a friction force between the hub and the sub-plate; and
   a second friction means disposed between the side plates and the sub-plate for exerting a friction force between the side plates and the sub-plate;
   said first friction means including a cylindrical bushing having
   a bushing flange at one end, extending radially, to be pressed to the inner flange portion, and
   a plurality of ribs which engage notches of the sub-plate;
   a cone spring having a predetermined axial length selected such that there is an insubstantial change in compression load on the cone spring when the predetermined axial length is reduced, having a plurality of notches which reduce elastic stiffness of the cone spring and which receive the plurality of ribs, the cone spring being disposed between the sub-plate and the bushing flange; and
   the sub-plate, the cone spring and the bushing being prevented from relative rotation by the ribs and notches.

2. A damper disc of claim 1 wherein said bushing is provided at the outer periphery with an axial integral rib.

3. A damper disc of claim 1 wherein a sub-plate is fixed to each side surface of the outer flange, the inner flange is integral with the hub, the inner and outer flanges mesh together with circumferential spaces therebetween, said bushing rotatably engages around the hub, the outer flange of the hub is radially positioned by the sub-plates and the bushing to the hub.

4. A damper disc of claim 1 wherein the bushing extends into the inner periphery of the side plate, and the side plate is rotatably fitted around the bushing.

5. A damper disc of claim 1 wherein said cone spring is used in a section of its load-deflection curve in which a compression load has small changes in response to a large change of deflection.

6. The damper disc according to claim 1 further including a second bushing having at least one axially extending rib and being axially spaced from the first bushing, and one of the side plates being disposed radially of the second bushing and having a notch receiving the rib of the second bushing to prevent relative rotation therebetween.

7. The damper disc according to claim 1 wherein the bushing has a sufficient axial length to extend from the inner flange portion to a position in radial alignment with the adjacent side plate, and the side plate is relatively rotatable with respect to the bushing so as to reduce frictional torque between the side plate and the hub, and the second side plate has a radial clearance with the hub so as to eliminate frictional torque therebetween.

8. The damper disc according to claim 1 further including a second bushing in radial alignment with one of the side plates, extending toward an adjacent one of the sub-plates, and having a flange, a second cone spring disposed between the flange of the second bushing and the side plate, and means for preventing relative rotation between the cone spring and the second bushing.

9. The damper disc according to claim 8 wherein the means for preventing relative rotation between the cone spring and the second bushing also prevent rotation between the second bushing and the associated side plate.

* * * * *